United States Patent
Okumura et al.

(10) Patent No.: US 11,309,173 B2
(45) Date of Patent: Apr. 19, 2022

(54) LIQUID SAMPLE INTRODUCTION METHOD AND LIQUID SAMPLE INTRODUCTION DEVICE

(71) Applicant: SHIMADZU CORPORATION, Kyoto (JP)

(72) Inventors: Daisuke Okumura, Kyoto (JP); Shingo Fujioka, Kyoto (JP); Kazuma Maeda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 237 days.

(21) Appl. No.: 16/613,160

(22) PCT Filed: Aug. 10, 2017

(86) PCT No.: PCT/JP2017/029051
§ 371 (c)(1),
(2) Date: Nov. 13, 2019

(87) PCT Pub. No.: WO2019/030886
PCT Pub. Date: Feb. 14, 2019

(65) Prior Publication Data
US 2021/0313163 A1    Oct. 7, 2021

(51) Int. Cl.
*H01J 49/04* (2006.01)
*G01N 27/623* (2021.01)
*G01N 1/00* (2006.01)

(52) U.S. Cl.
CPC ............. *H01J 49/045* (2013.01); *G01N 1/00* (2013.01); *G01N 27/623* (2021.01); *G01N 2001/002* (2013.01)

(58) Field of Classification Search
CPC ... H01J 49/045; G01N 1/00; G01N 2001/002; G01N 27/623
See application file for complete search history.

(56) References Cited

U.S. PATENT DOCUMENTS 5,703,360 A * 12/1997 Fischer ............... H01J 49/0009
250/252.1
10,529,548 B2 * 1/2020 Okumura ............... G01N 30/72
(Continued)

FOREIGN PATENT DOCUMENTS

| JP | 07-209190 A | 8/1995 |
| WO | 2017/056173 A1 | 4/2017 |
| WO | 2017/094178 A1 | 6/2017 |

OTHER PUBLICATIONS

International Search Report for PCT/JP2017/029051 dated Oct. 31, 2017 (PCT/ISA/210).
(Continued)

*Primary Examiner* — Wyatt A Stoffa
(74) *Attorney, Agent, or Firm* — Sughrue Mion, PLLC

(57) ABSTRACT

The other end of an individual sample supply channel one end of which is connected to a gas buffer container the inside of which is empty is connected to one sub-port of a valve that selects one of standard samples to be supplied to an ESI probe. During analysis, the standard sample stored in one of liquid sample containers is selected by switching a connection state of the valve. The standard sample supplied by being pushed by a gas sent to the liquid sample containers through liquid supply gas branch channels is sent to the ESI probe through a sample supply main channel. At the time of finishing analysis, when the valve is switched such that the sub-port and a main port are communicatively connected, a nitrogen gas is sent to the sample supply main channel, and the remaining liquid is discharged.

2 Claims, 7 Drawing Sheets

(56) References Cited

U.S. PATENT DOCUMENTS

| | | | |
|---|---|---|---|
| 10,591,450 B2* | 3/2020 | Maeda | H01J 49/0409 |
| 2008/0283741 A1* | 11/2008 | Mukaibatake | H01J 49/0431 |
| | | | 250/288 |
| 2013/0146479 A1* | 6/2013 | Brouwer | G01R 33/46 |
| | | | 205/780.5 |
| 2018/0372696 A1 | 12/2018 | Maeda | |
| 2019/0013189 A1 | 1/2019 | Okumura et al. | |
| 2021/0249250 A1* | 8/2021 | Maeda | H01J 49/42 |

OTHER PUBLICATIONS

Written Opinion for PCT/JP2017/029051 dated Oct. 31, 2017 (PCT/ISA/237).

* cited by examiner

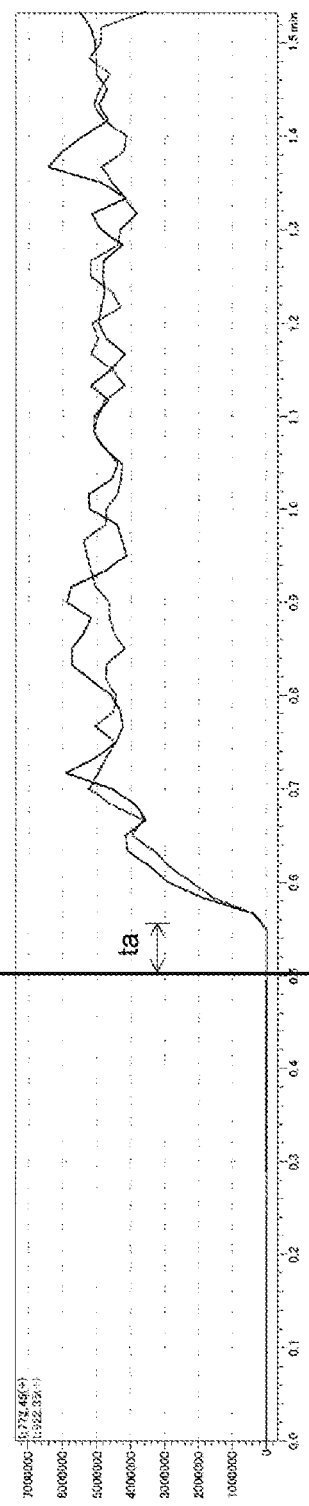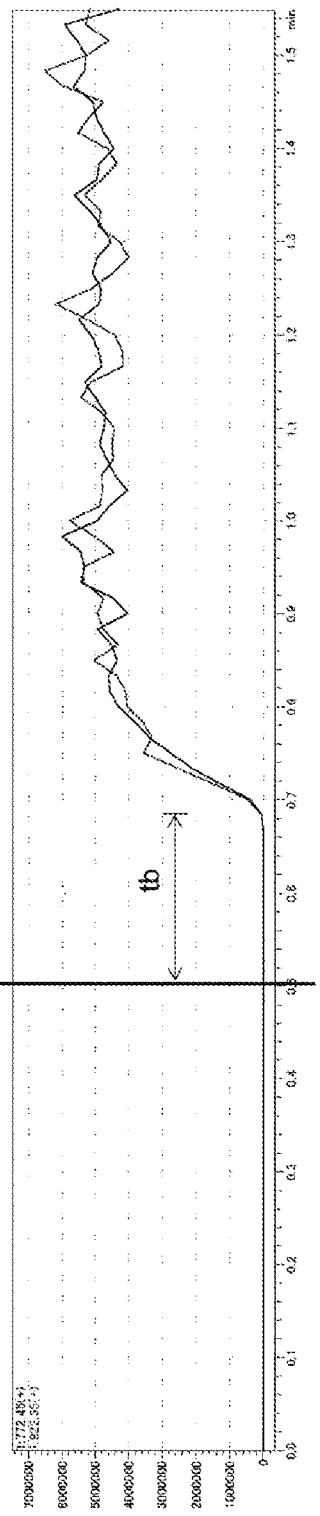
Fig. 7A  PRESENT INVENTION
Fig. 7B  METHOD OF RELATED ART

LIQUID SAMPLE INTRODUCTION METHOD AND LIQUID SAMPLE INTRODUCTION DEVICE

CROSS REFERENCE TO RELATED APPLICATIONS

This application is a National Stage of International Application No. PCT/JP2017/029051 filed Aug. 10, 2017.

TECHNICAL FIELD

The present invention relates to a method of introducing a liquid sample into an atmospheric pressure ion source that ionizes components in a sample in an ion analysis device such as a mass spectrometer or an ion mobility analysis device, and a liquid sample introduction device used therefor.

BACKGROUND ART

In a liquid chromatograph mass spectrometer (LC-MS), a liquid sample containing components temporally separated by a column of a liquid chromatograph (LC) is introduced into the mass spectrometer. The mass spectrometer includes an ion source that performs ionization by, for example, an electrospray ionization (ESI) method or an atmospheric pressure chemical ionization (APCI) method in order to ionize the components (compounds) in the liquid sample. For example, in an ESI ion source, the liquid sample is guided to a tip of a thin tube and exposed to a large electric field, and is nebulized in a substantially atmospheric pressure with the help of a nebulizing gas. Fine charged droplets having charges biased by an action of an electric field are formed, the charged droplets become finer by colliding with the atmosphere, and components in the droplets become gas ions while the solvent in the droplets is evaporated.

In the LC-MS, in order to perform mass calibration and adjust device parameters, it is necessary to perform an analysis by introducing a standard sample, instead of the liquid sample supplied from an LC, into the ion source. For example, a device described in Patent Literature 1 has a configuration in which the liquid sample supplied from the LC and the standard sample pressurized by an air pressure are selectively supplied to the ionization probe by switching the flow paths using a switching valve. In the device described in Patent Literature 1, it is necessary to prepare different gas systems: one for sending the standard sample and the other for nebulizing the liquid sample to the ionization probe. Thus, it is problematic in terms of cost.

In contrast, in the liquid sample introduction device proposed by the applicant of the present invention in Patent Literature 2, the gas branched from one gas source is supplied to both the ionization probe and a liquid sample container in which the standard sample is stored, and thus, the aforementioned problem in the device described in Patent Literature 1 is solved.

CITATION LIST

Patent Literature

Patent Literature 1: U.S. Pat. No. 5,703,360 A
Patent Literature 2: WO 2017/056173 A

SUMMARY OF INVENTION

Technical Problem

In the liquid sample introduction device described in Patent Literature 2, the gas from one gas source is branched and supplied to a plurality of liquid sample containers. One among different kinds of liquid samples stored in the plurality of liquid sample containers is selected by one channel switching valve (N-position (N+1)-port valve), and the selected liquid sample is supplied to the ionization probe through one liquid supply channel. Accordingly, any one of a plurality of different types of liquid samples can be selectively introduced into the ion source by using one channel switching valve.

In the liquid sample introduction device described in Patent Literature 2, when the supply of the nebulizing gas from the gas source to the ionization probe is stopped at the time of finishing the analysis, the liquid sample (or the moving phase supplied from the liquid chromatograph) remains in the liquid supply channel between the channel switching valve and the ionization probe. Thus, even when the supply of the gas to the liquid sample container is started at the time of executing the next analysis and the liquid sample in the liquid sample container is accordingly started to be sent, the liquid sample or the moving phase remaining in the liquid supply channel from the previous analysis are introduced into the ion source for a while. Since the analysis cannot be properly performed during that time, an analysis dead time is caused. Such dead time leads to a decrease in analysis efficiency.

The present invention has been made to solve the problems, and an object of the present invention is to provide a liquid sample introduction method and a liquid sample introduction device capable of improving analysis efficiency by shortening a waiting time (that is, dead time) until a liquid sample to be analyzed is introduced into an atmospheric pressure ion source at the time of starting analysis.

Solution to Problem

According to a first aspect of a liquid sample introduction method according to the present invention made in order to solve the aforementioned problems, there is provided a liquid sample introduction method using a liquid sample introduction device configured to send a liquid sample and a nebulizing gas to an ionization probe of an ion source in an ion analysis device and to nebulize the liquid sample from a tip of the ionization probe with the help of the nebulizing gas. The liquid sample introduction device includes a plurality of liquid sample containers each of which is a closed container and in which a liquid sample is stored, a liquid supply gas path connected at one end to a middle of a channel for supplying the nebulizing gas to the ionization probe and branched into a plurality of sub-paths each end of which is connected to each of the plurality of liquid sample containers above liquid level of the liquid sample, a channel switching unit configured to selectively connect one outlet port and one of a plurality of inlet ports to each other, a common sample supply channel one end of which is connected to the ionization probe and the other end is connected to the outlet port of the channel switching unit, and a plurality of individual sample supply channels one ends of which are connected to the plurality of liquid sample containers below the liquid levels of the liquid samples and the other ends are connected to the plurality of inlet ports of the channel switching unit.

The method includes a process of setting one of the plurality of liquid sample containers to be in an empty state, and switching connection of the channel switching unit such that the outlet port and the inlet port connected to the liquid sample container which is in the empty state are connected to each other through one of the plurality of individual sample supply channels at a time of finishing analysis in the ion analysis device.

As in the first aspect, according to a second aspect of a liquid sample introduction method according to the present invention made in order to solve the aforementioned problems, there is provided a liquid sample introduction method using a liquid sample introduction device configured to send a liquid sample and a nebulizing gas to an ionization probe of an ion source in an ion analysis device and to nebulize the liquid sample from a tip of the ionization probe the help of the nebulizing gas. The liquid sample introduction device includes a plurality of liquid sample containers each of which is a closed container and a liquid sample is stored, a liquid supply gas path connected at one end to a middle of a channel for supplying the nebulizing gas to the ionization probe and branched into a plurality of sub-paths connected respectively to the plurality of liquid sample containers above liquid levels of the liquid samples, a channel switching unit configured to selectively connect one outlet port and one of a plurality of inlet ports to each other, a common sample supply channel one end of which is connected to the ionization probe and the other end is connected to the outlet port of the channel switching unit, and a plurality of individual sample supply channels one ends of which are connected to the plurality of liquid sample containers below the liquid levels of the liquid samples and the other ends are connected to the plurality of inlet ports of the channel switching unit.

The method includes a process of setting one of the plurality of liquid sample containers as a low-viscosity liquid sample container in which a liquid having a viscosity lower than viscosities of the liquid sample stored in the other liquid sample containers is stored, and switching connection of the channel switching unit such that the outlet port and the inlet port connected to the low-viscosity liquid sample container are connected to each other through one of the plurality of individual sample supply channels at a time of finishing analysis in the ion analysis device.

In the liquid sample introduction method and the liquid sample introduction device according to the present invention, the "ion analysis device" is typically a mass spectrometer, an ion mobility analysis device, or an ion mobility-mass spectrometer obtained by combining the mass spectrometer and the ion mobility analysis device. The "ion source" in these devices is an ion source based on an atmospheric pressure ionization method including an atmospheric pressure photoionization (APPI) method in addition to the ESI method and the APCI method described above.

In the liquid sample introduction device used in the liquid sample introduction method according to the present invention, when a liquid sample stored in a liquid sample container is analyzed, the connection of the channel switching unit is switched such that the inlet port connected to the individual sample supply channel one end of which is connected to the liquid sample container and the outlet port are connected to each other. The gas is sent to a space within the liquid sample container through the liquid supply gas path, and the pressure in the space is higher than that outside the container. Thus, the liquid sample in the container pushed by the pressure passes through the individual sample supply channel, and is introduced into the ionization probe through the internal channel of the channel switching unit and the common sample supply channel. The liquid sample is nebulized from the ionization probe with the help of the nebulizing gas, and the components in the liquid sample are ionized by a mechanism according to the ionization method.

When the supply of the nebulizing gas is stopped at the time of finishing the analysis, the supply of the liquid sample is also stopped, and the liquid sample remains in the common sample supply channel. Meanwhile, in the first aspect of the liquid sample analysis method according to the present invention, at the time of finishing the analysis, the connection of the channel switching unit is switched such that the outlet port and the inlet port connected to the individual sample supply channel connected to the liquid sample container which is in the empty state. Since the internal pressure of the liquid sample container which is in the empty state is high, when the connection of the channel switching unit is switched as described above, the gas (air) flows to the common sample supply channel through the internal channel of the channel switching unit, and pushes out the liquid remaining in the channel. Accordingly, the common sample supply channel is filled with the gas.

The viscosity of gas (air) is much smaller than the viscosity of liquid. If the common sample supply channel is filled with liquid having a viscosity higher than the viscosity of gas, it takes time to discharge the liquid and replace the liquid with a new liquid sample. In contrast, when the common sample supply channel is filled with gas, when the liquid sample is supplied into the common sample supply channel, the gas in the channel is quickly discharged, and the liquid sample enters. That is, in a shorter time, a new liquid sample fills the common sample supply channel and is introduced into the ionization probe. Accordingly, a time required from when the analysis starts to when a target liquid sample starts to be nebulized from the ionization probe, that is, a dead time can be shortened.

Meanwhile, in the second aspect of the liquid sample analysis method according to the present invention, the connection of the channel switching unit is switched as described above at the time of finishing the analysis, and thus, the liquid in the common sample supply channel is replaced with the liquid having a viscosity lower than the liquid sample or the moving phase. In general, a solvent of the liquid sample used in the liquid chromatograph and the mass spectrometer is an organic solvent or a mixture of an organic solvent and water. Therefore, the liquid having a viscosity lower than the viscosity of the liquid sample or the moving phase is typically water. Since the liquid in the common sample supply channel is the low-viscosity liquid, the replacement of the liquid can be completed in a shorter time when the liquid sample for the next analysis is supplied to the common sample supply channel compared to a case where the liquid sample or the moving phase having a higher viscosity remains in the common sample supply channel. Accordingly, a time required from when the analysis starts to when a target liquid sample starts to be nebulized from the ionization probe, that is, a dead time can be shortened.

In both the first and second aspects of the liquid sample introduction method according to the present invention, the switching of the connection of the channel in the channel switching unit may be automatically performed, or may be manually operated by an operator.

According to a first aspect of a liquid sample introduction device according to the present invention made in order to solve the aforementioned problems, there is provided a liquid sample introduction device configured to send a liquid sample and a nebulizing gas to an ionization probe of an ion source in an ion analysis device and to nebulize the liquid sample from a tip of the ionization probe with the help of the nebulizing gas.

The device includes a) a liquid sample container which is a closed container in which a liquid sample is stored, b) a gas buffer container which is in a closed state, c) a gas supply auxiliary path connected at one end to a middle of a path for supplying the nebulizing gas to the ionization probe and branched into sub-paths one of which is connected to the liquid sample container above a liquid level and another to the gas buffer container, d) a channel switching unit configured to selectively connect one outlet port and one of a plurality of inlet ports to each other, e) a common sample supply channel one end of which is connected to the ionization probe and the other end is connected to the outlet port of the channel switching unit, f) an individual sample supply channel one end of which is connected to the liquid sample container so as to be positioned below the liquid level of the liquid sample and another end is connected to one of the plurality of inlet ports of the channel switching unit, g) a replacement gas path one end of which is connected to the gas buffer container and the other end is connected to one of the plurality of inlet ports of the channel switching unit, and h) a control unit configured to switch connection of the channel switching unit such that the outlet port and the inlet port connected to the replacement gas path are connected to each other at a time of finishing analysis in the ion analysis device.

According to a second aspect of a liquid sample introduction device according to the present invention made in order to solve the aforementioned problems, there is provided a liquid sample introduction device configured to send a liquid sample and a nebulizing gas to an ionization probe of an ion source in an ion analysis device and to nebulize the liquid sample from a tip of the ionization probe with the help of the nebulizing gas.

The device includes a) a liquid sample container which is a closed container in which a liquid sample is stored, b) a gas supply auxiliary path connected at one end to a middle of a path of the nebulizing gas to the ion source and branched into sub-paths which are connected to the liquid sample container above a liquid level and one of a plurality of inlet ports of a channel switching unit, c) the channel switching unit configured to selectively connect one outlet port and one of the plurality of inlet ports to each other, d) a common sample supply channel one end of which is connected to the ionization probe and the other end is connected to the outlet port of the channel switching unit, e) an individual sample supply channel one end of which is connected to the liquid sample container so as to be positioned below a liquid level of the liquid sample and the other end is connected to one of the plurality of inlet ports of the channel switching unit, and f) a control unit configured to switch connection of the channel switching unit such that the outlet port and the inlet port connected to the gas supply auxiliary path are connected to each other at a time of finishing analysis in the ion analysis device.

According to a third aspect of a liquid sample introduction device according to the present invention made in order to solve the aforementioned problems, there is provided a liquid sample introduction device configured to send a liquid sample and a nebulizing gas to an ionization probe of an ion source in an ion analysis device and to nebulize the liquid sample from a tip of the ionization probe with the help of the nebulizing gas.

The device includes a) a liquid sample container which is a closed container in which a liquid sample is stored, b) a gas supply auxiliary path one end of which is connected in a middle of a channel for supplying the nebulizing gas to the ionization probe and the other end is connected to the liquid sample container above a liquid level of the liquid sample, c) a channel switching unit configured to selectively connect one outlet port and one of a plurality of inlet ports to each other, d) a common sample supply channel one end of which is connected to the ionization probe and the other end is connected to the outlet port of the channel switching unit, e) an individual sample supply channel one end of which is connected to the liquid sample container so as to be positioned below the liquid level of the liquid sample and the other end is connected to one of the plurality of inlet ports of the channel switching unit, f) a replacement gas introduction path one end of which is connected to one of the plurality of inlet ports and the other end is open to an atmosphere, and g) a control unit configured to switch connection of the channel switching unit such that the outlet port and the inlet port connected to the replacement gas introduction path are connected to each other in a state in which the nebulizing gas is supplied to the ionization probe at a time of finishing analysis in the ion analysis device.

The first aspect of the liquid sample introduction device according to the present invention automatically switches the connection of the channel switching unit, that is, according to a predetermined sequence or program by the control unit by using the gas buffer container as the liquid sample container which is in the empty state in the liquid sample introduction method according to the first aspect at the time of finishing the analysis. Accordingly, when the next analysis for the liquid sample is performed, the common sample supply channel is filled with the gas (air). Thus, when the liquid sample to be analyzed is supplied to the common sample supply channel, a new liquid sample fills the common sample supply channel in a shorter time, and is introduced into the ionization probe. As a result, the time required from when the analysis starts to when the target liquid sample starts to be nebulized from the ionization probe, that is, a dead time can be shortened.

In the second aspect of the liquid sample introduction device according to the present invention, when the control unit switches the connection of the channel switching unit at the time of finishing the analysis, the gas is directly supplied to the common sample supply channel through the gas supply auxiliary path, and the liquid in the common sample supply channel is replaced with the gas. Accordingly, as in the liquid sample introduction device of the first aspect, when the next liquid sample to be analyzed is supplied to the common sample supply channel, a new liquid sample fills the common sample supply channel in a shorter time, and is introduced into the ionization probe. As a result, the time required from when the analysis starts to when the target liquid sample starts to be nebulized from the ionization probe, that is, a dead time can be shortened.

In the third aspect of the liquid sample introduction device according to the present invention, when the control unit switches the connection of the flow channel switching unit at the time of finishing the analysis, the other end of the common sample supply channel one end of which is connected to the ionization probe is open to the atmosphere through the internal channel of the channel switching unit and the replacement gas introduction path. Since the nebulizing gas is supplied to the ionization probe, the end of the common sample supply channel on the ionization probe side becomes negative pressure due to the flow. Thus, due to the pressure difference between the two ends of the common sample supply channel, the air flows from the atmosphere at the open end into the common sample supply channel, and the liquid in the common sample supply channel is replaced with the air. Accordingly, as in the liquid sample introduction device of the first and second aspects, when the next liquid sample to be analyzed is supplied to the common sample supply channel, a new liquid sample fills the common sample supply channel in a shorter time, and is introduced into the ionization probe. As a result, the time required from when the analysis starts to when the target liquid sample starts to be nebulized from the ionization probe, that is, a dead time can be shortened.

Advantageous Effects of Invention

According to the liquid sample introduction method and the liquid sample introduction device according to the present invention, it is possible to reduce the time required from when the analysis starts to when the target liquid sample starts to be nebulized from the ionization probe, that is, the analysis dead time. Accordingly, it is possible to improve analysis efficiency. Whenever the analysis is performed, the liquid remaining in the common sample supply channel is replaced with the gas (air) or the liquid (for example, water) having a lower viscosity than the remaining liquid, and thus, there is also an advantage that it is possible to reduce undesirable contamination due to mixing of components.

BRIEF DESCRIPTION OF DRAWINGS

FIGS. 7A-7B are diagrams illustrating a chromatogram obtained by actual measurement for describing a difference in effect between the liquid sample introduction device according to the present invention and a device of the related art.

DESCRIPTION OF EMBODIMENTS

Hereinafter, embodiments of a liquid sample introduction device according to the present invention will be described with reference to the accompanying drawings.

Figure 1:
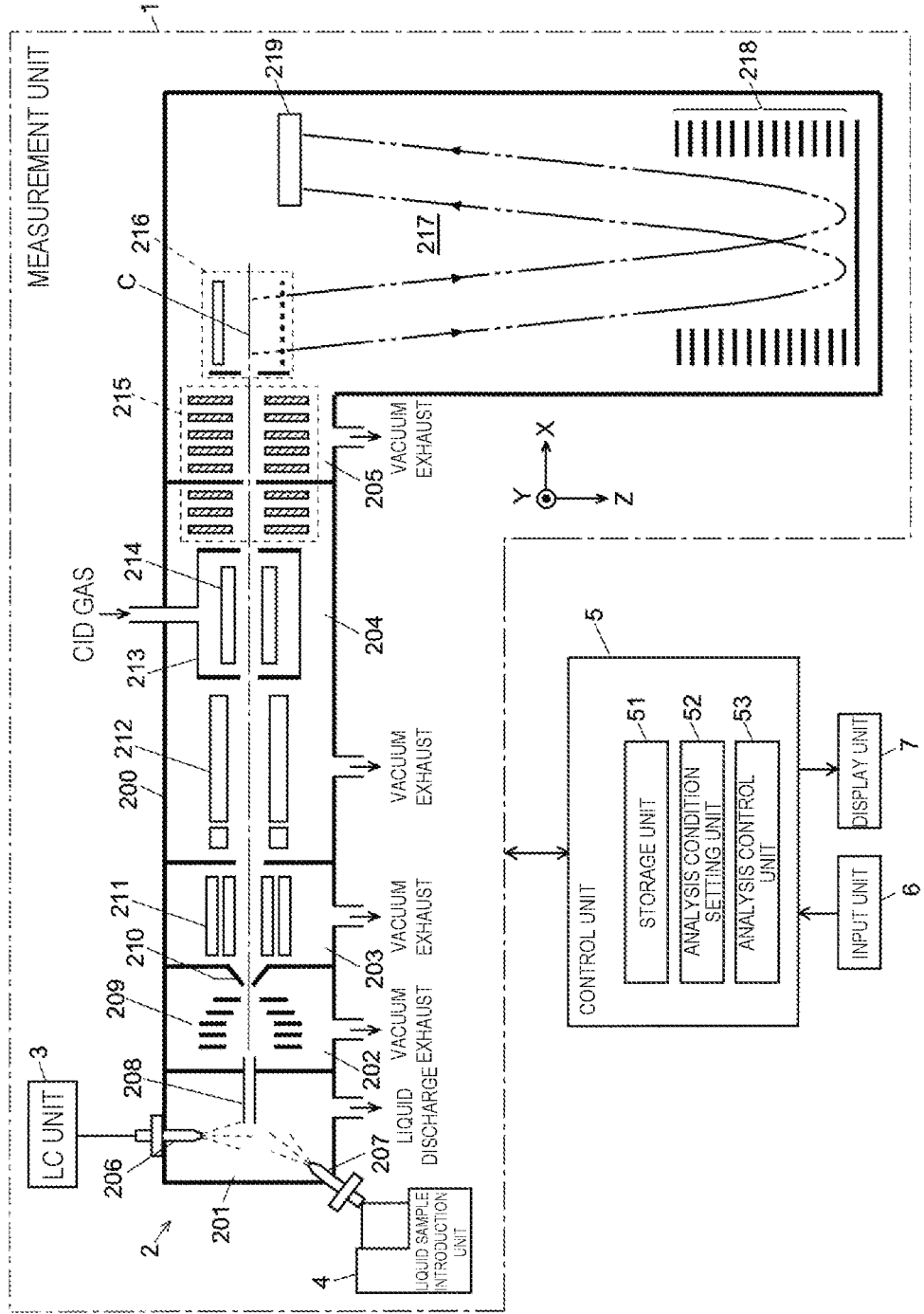
FIG. 1 is a configuration diagram of a main part of an example of a mass spectrometer using a liquid sample introduction device according to the present invention.

For example, the liquid sample introduction device according to the present invention is used for introducing a standard sample for mass calibration into an ion source simultaneously with, or immediately before or after mass analysis for various components included in a liquid sample eluted from a column of a liquid chromatograph (LC) (not illustrated) in a quadrupole-time-of-flight mass spectrometer (so-called "Q-TOFMS") illustrated in FIG. 1. Of course, the present invention is not limited to the Q-TOFMS, and it is apparent that a liquid sample introduction device according to the following various embodiments and a liquid sample introduction device having the same configuration as that in these embodiments can also be used in a mass spectrometer having another configuration and an ion mobility analysis device as long as an atmospheric ion source is provided.

Entire Configuration of Mass Spectrometer

In FIG. 1, a measurement unit 1 includes a mass spectrometry unit 2, an LC unit 3, and a liquid sample introduction unit 4. The mass spectrometry unit 2 includes an ionization room 201 which is under a substantially atmospheric pressure atmosphere and a main analysis room 205 which is evacuated by a vacuum pump (not illustrated) and is maintained under a high vacuum atmosphere within a chamber 200. A first intermediate vacuum room 202, a second intermediate vacuum room 203, and a pre-stage analysis room 204 whose a degree of vacuum is step-wisely increased are arranged between the ionization room and the main analysis room. The ionization room 201 and the first intermediate vacuum room 202 are communicatively connected to each other via a small-diameter desolvation tube 208, and the first intermediate vacuum room 202 and the second intermediate vacuum room 203 are communicatively connected to each other via a small-diameter orifice formed at a top of a conical skimmer 210.

A first ESI probe 206 connected to the LC unit 3 and a second ESI probe 207 connected to the liquid sample introduction unit 4 are arranged in the ionization room 201. In the first intermediate vacuum room 202, an ion guide 209 including a plurality of electrode plates are arranged so as to surround an ion optical axis C. In the second intermediate vacuum room 203, an ion guide 211 including a plurality of rod electrodes arranged so as to surround the ion optical axis C is disposed. A quadrupole mass filter 12 and a collision cell 213 in which ion guides 214 are arranged are arranged within the pre-stage analysis room 204, and an ion transport optical system 215 including a plurality of ring-shaped electrodes is disposed over the pre-stage analysis room 204 and the main analysis room 205. An orthogonal acceleration unit 216, a flight space 217 including a reflector 218, and an ion detector 219 are arranged within the main analysis room 205.

A control unit 5 includes a storage unit 51, an analysis condition setting unit 52, and an analysis control unit 53, and controls operations of the units included in the measurement unit 1. An input unit 6 and a display unit 7 are connected to the control unit 5, as user interfaces. Although not illustrated herein, a data processing unit that processes detection data obtained by the ion detector 219 is provided. Usually, the control unit 5 and the data processing unit (not illustrated) are personal computers. A required software installed on the computer operates on the computer, and thus, functions of the control unit 5 and the data processing unit are exhibited.

Description of Analysis Operation of Mass Spectrometer

An example of an analysis operation in this mass spectrometer will be schematically described.

A plurality of method files storing analysis conditions is stored in the storage unit 51 in advance. The analysis condition setting unit 52 reads out an appropriate method file from the storage unit 51 according to an instruction through the input unit 6, and the analysis control unit 53 controls the units of the measurement unit 1 according to the readout method file. Under this control, a liquid sample containing various components temporally separated by the column of the LC unit 3 is continuously supplied to the first ESI probe 206. The first ESI probe 206 nebulizes, as fine charged droplets, the liquid sample into the ionization room 201. As will be described below, the standard sample for mass calibration sent from the liquid sample introduction unit 4 is similarly nebulized, as fine charged droplets, from the second ESI probe 207 into the ionization room 201.

These charged droplets collide with the atmosphere in the ionization room 201, and thus, finer charged droplets are obtained. Components in the droplets are ionized when a solvent is vaporized. The generated ions are drawn into the desolvation tube 208 by a differential pressure between the ionization room 201 and the first intermediate vacuum room 202, pass through the two intermediate vacuum rooms 202 and 203 while being converged by the ion guides 209 and 211, and are introduced into the quadrupole mass filter 212 in the pre-stage analysis room 204.

A voltage obtained by combining a high-frequency voltage and a DC voltage is applied to each rod electrode constituting the quadrupole mass filter 212. Ions (usually, called precursor ions) having a specific mass-to-charge ratio m/z corresponding to this voltage selectively pass through the mass filter 212, and are introduced into the collision cell 213. A collision gas such as Ar is introduced into the collision cell 213. The precursor ions come into contact with the collision gas, and dissociate to generate various product ions. The generated product ions are introduced into the orthogonal acceleration unit 216 within the main analysis room 205 while being converged by the ion transport optical system 215.

In FIG. 1, the ions (product ions) introduced into the orthogonal acceleration unit 216 in an X-axis direction are accelerated in a pulse shape in a Y-axis direction at a predetermined timing. The accelerated ions enter the flight space 217 and fly. The ions are turned back by a reflected electric field formed by the reflector 218, and finally reach the ion detector 219. Among the ions which are almost simultaneously ejected from the orthogonal acceleration unit 216, ions having a smaller mass-to-charge ratio fly faster, and reach the ion detector 219 with a time difference corresponding to the mass-to-charge ratio. The ion detector 219 outputs, as a detection signal, a current corresponding to the amount of reached ions. It is possible to create a time-of-flight spectrum by plotting a time (that is, flight time) when the ions arrive by using a point of time when the ions are ejected from the orthogonal acceleration unit 216 as a starting point, and it is possible to obtain a mass spectrum by converting the flight time into the mass-to-charge ratio.

Configuration and Operation of Liquid Sample Introduction Unit

Figure 2:
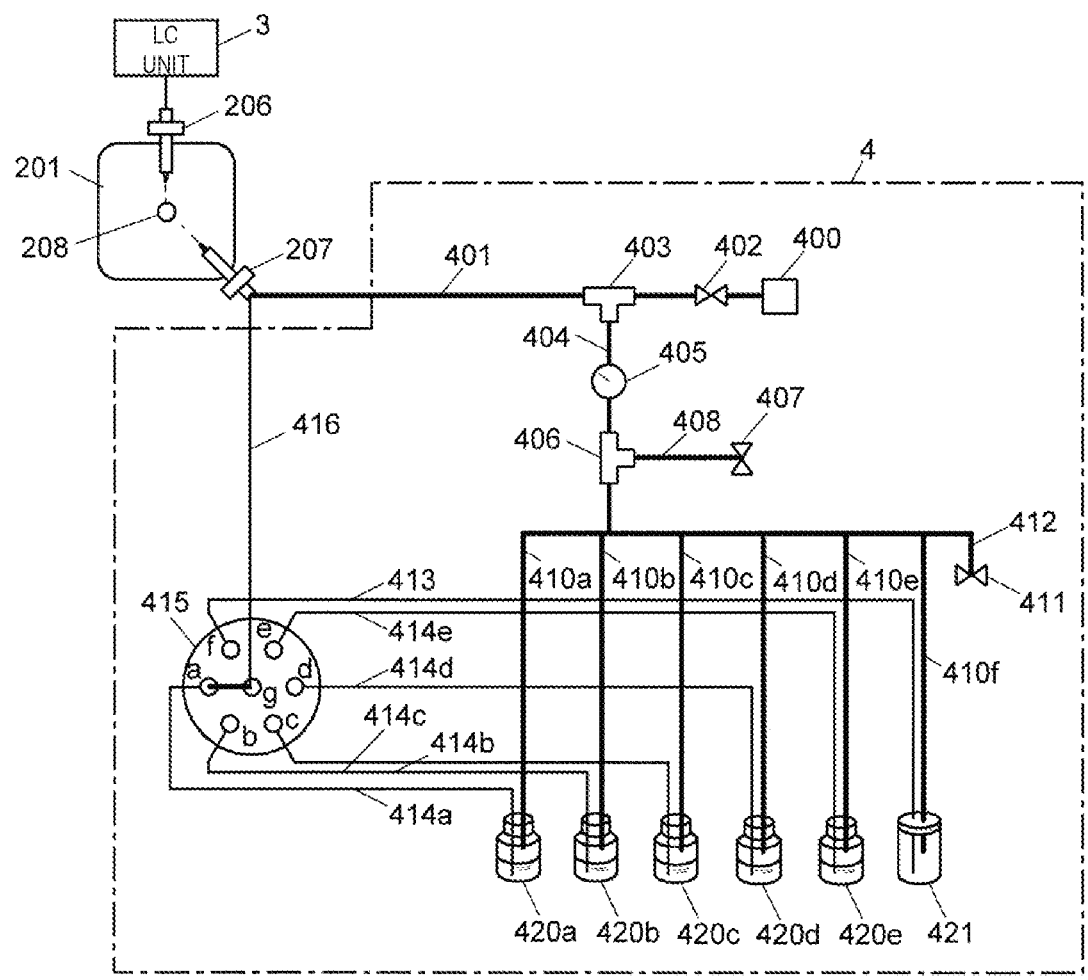
FIG. 2 is a channel configuration diagram illustrating an embodiment (first embodiment) of a liquid sample introduction unit in the mass spectrometer illustrated in FIG. 1.
Figure 3:
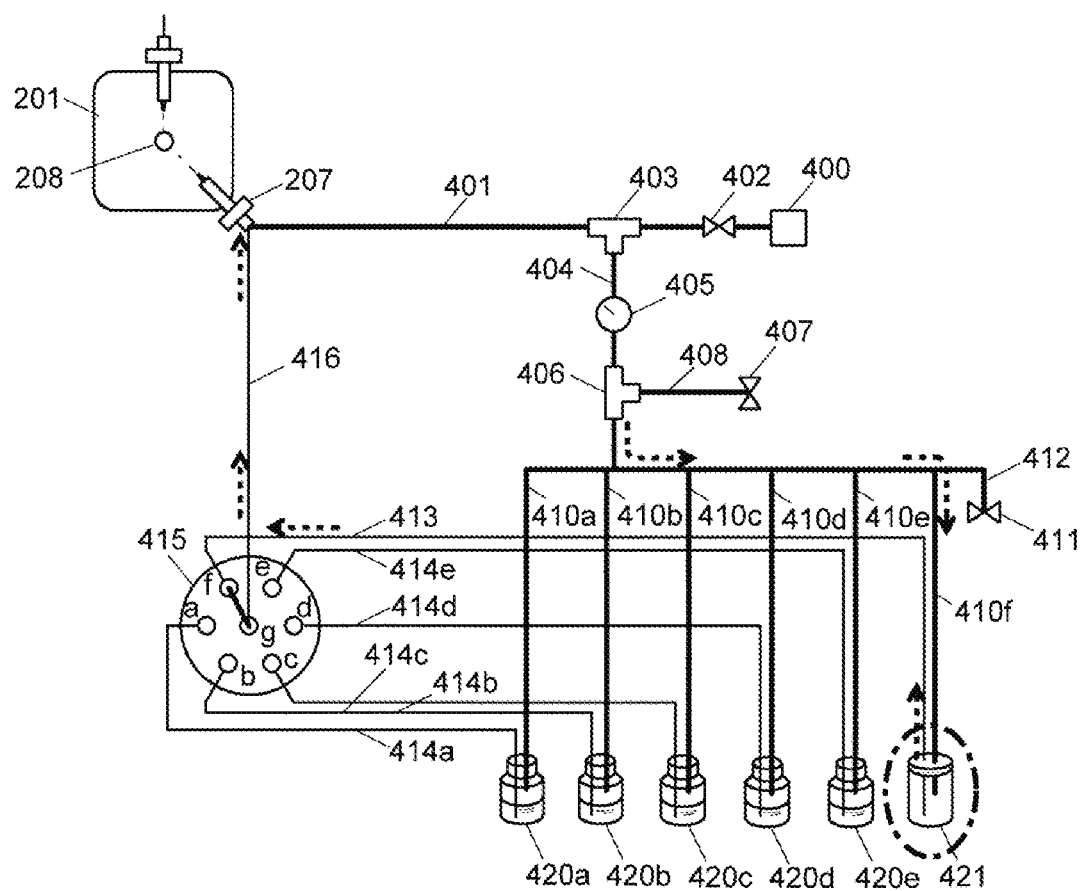
FIG. 3 is a diagram illustrating a state when a residual solution is discharged in the liquid sample introduction unit illustrated in FIG. 2.

Next, the detailed configuration and operation of the liquid sample introduction unit 4 according to the first embodiment which supplies a liquid to the second ESI probe 207 for generating ions derived from the standard sample mass calibration will be mainly described. FIG. 2 is a configuration diagram of the liquid sample introduction unit 4 in the mass spectrometer, and FIG. 3 is a diagram illustrating a state of the liquid sample introduction unit 4 when the residual solution is discharged.

One end of a nebulizing gas path 401 connected to a nitrogen gas cylinder (atomization gas source) 400 is connected to a nebulizing gas conduit (not illustrated) of the second ESI probe 207 disposed in the ionization room 201. A valve 402 and a branch part 403 are provided at the nebulizing gas path 401 in order from a side closer to the nitrogen gas cylinder 400, and one end of a liquid supply gas main channel 404 is connected to the branch part 403. A regulator 405 and a branch part 406 are provided at the liquid supply gas main channel 404, and a relief channel 408 connected to a relief valve 407 is connected to the branch part 406. The other end of the liquid supply gas main channel 404 is branched into six liquid supply gas branch channels 410a to 410f. Ends of the five liquid supply gas branch channels 410a to 410e are connected to spaces above liquid levels of solutions in containers (liquid sample containers) 420a to 420e in which standard sample solutions are stored. An end of one liquid supply gas branch channel 410f is connected to a gas buffer container 421 which is a substantially closed empty bottle. An atmosphere release channel 412 connected to an atmosphere release valve 411 is provided in parallel with the liquid supply gas branch channels 410a to 410f. All of the liquid sample containers 420a to 420e are substantially closed.

In the second ESI probe 207, one end of a common sample supply channel 60 is connected to a capillary (not illustrated) through which a liquid sample flows, and the other end is connected to a main port (outlet port) g of a 6-position 7-port valve 415. One ends of individual sample supply channels 414a to 414e are connected to sub-ports (inlet ports) a to e of the 6-position 7-port valve 415, and the other ends of these channels 414a to 414e are connected below the liquid levels of the solutions (that is, in the solutions) within the liquid sample containers 420a to 420e. One end of a replacement gas path 413 is connected to the sub-port f of the 6-position 7-port valve 415, and the other end thereof is connected within the gas buffer container 421. The standard samples stored in the five liquid sample containers 420a to 420e are solutions in which components for generating a plurality of ions having different known mass-to-charge ratios are dissolved. The replacement gas path 413 and the individual sample supply channels 414a to 414e are substantially the same, and when gas replacement at the time of finishing the analysis to be described below is not performed, it is also possible to provide a liquid sample container containing another standard sample instead of the gas buffer container 421.

The operation of the liquid sample introduction unit 4 of this embodiment during the above-described mass spectrometry will be described.

When mass analysis for the ions derived from the components in the liquid sample introduced from the LC unit 3 to the first ESI probe 206 is performed as described above, the analysis control unit 53 controls the connection of the valve 415 such that any one of the sub-ports (inlet ports) a to e of the 6-position 7-port valve 415 is communicatively connected to the main port g within a predetermined measurement time range according to the analysis method which is created in advance and is stored in the storage unit 51.

During the analysis, a nitrogen gas is supplied from the nitrogen gas cylinder 400 to the nebulizing gas path 401 at a predetermined flow rate and a predetermined pressure. A part of the nitrogen gas flows into the liquid supply gas main channel 404 through the branch part 403, is reduced to a predetermined pressure by the regulator 405, and is sent to the liquid sample containers 420a to 420e and the gas buffer container 421 through the liquid supply gas branch channels 410a to 410f. Accordingly, the insides of the liquid sample containers 420a to 420e and the gas buffer container 421 are simultaneously pressurized, and the standard samples stored in the liquid sample containers 420a to 420e are sent to the individual sample supply channels 414a to 414e, respectively. When an abnormality occurs in the regulator 405 and a gas pressure in the liquid supply gas main channel 404 is equal to or greater than a predetermined value, the relief valve 407 is opened and the nitrogen gas is released to the outside.

A flow rate and a pressure of the nebulizing gas supplied from the nitrogen gas cylinder 400 may be determined according to the specifications of the ionization probe (second ESI probe 207 in this embodiment) to be used, and a pressure of the liquid supply gas flowing to the liquid supply gas main channel 404 may be determined according to a target delivery amount of the standard sample. However, it is natural that both the pressures of the nebulizing gas and the liquid supply gas are higher than the pressure within the ionization room 201.

The standard samples sent to the individual sample supply channels 414a to 414e reach the five sub-ports a to e of the 6-position 7-port valve 415. As described above, during the analysis, only one of the sub-ports a to e of the 6-position 7-port valve 415 is connected to the main port g. This connection is switched as an analysis time elapses. However, the standard sample (the standard sample stored in any one of the liquid sample containers 420a to 420e) sent to any one of the sub-ports a to e communicatively connected to the main port g flows to the sample supply main channel 416 through the main port g, and is introduced into the second ESI probe 207. Therefore, as the connection is switched in the 6-position 7-port valve 415, the kind of the standard sample introduced into the second ESI probe 207 via the sample supply main channel 416 also changes.

When a series of analyses are finished, the analysis control unit 53 controls the valve 415 such that the sub-port f and the main port g are connected in the 6-position 7-port valve 415 (see FIG. 3). The liquid such as the standard sample is not stored in the gas buffer container 421 communicatively connected to the sub-port f via the replacement gas path 413, and the pressurized nitrogen gas is supplied to the sub-port f. Therefore, when the sub-port f and the main port g are communicatively connected to each other as described above, the nitrogen gas flows into the sample supply main channel 416 through the main port g, pushes out the standard sample remaining in the sample supply main channel 416, and is discharged from the second ESI probe 207. Accordingly, the standard sample in the sample supply main channel 416 is replaced with nitrogen gas. After a predetermined time elapses, the pressurization in the liquid sample containers 420a to 420e and the gas buffer container 421 is released by closing the valve 402 of the nebulizing gas path 401 and then opening the atmosphere release valve 411.

Not only at the time of finishing the analysis but also when the analysis is interrupted in the middle by, for example, an instruction of a user, a process of flowing the nitrogen gas into the sample supply main channel 416 may be similarly performed.

As described above, in the liquid sample introduction unit 4 of the present embodiment, the liquid sample remaining in the sample supply main channel 416 and an internal channel that connects the main port and the sub-ports of the 6-position 7-port valve 415 to each other is replaced with the nitrogen gas at the time of finishing the analysis. Thus, at the time of the next analysis or at the time of resuming the interrupted analysis, when the standard sample is sent from any one of the sub-ports a to e of the 6-position 7-port valve 415 to the sample supply main channel 416 via the main port g, the standard sample quickly reaches the second ESI probe 207, and the charged droplets are nebulized from the second ESI probe 207.

FIGS. 7A-7B are chromatograms obtained by measuring changes in signal strength over time for the components in the standard sample in a case (a) where the liquid starts to be sent by switching the 6-position 7-port valve 415 from a state in which there is an air in the sample supply main channel 416 and a case (b) where the liquid starts to be sent by switching the 6-position 7-port channel 415 from a state in which the sample supply main channel 416 is filled with a solvent, in FIGS. 7A-7B, times ta and tb from when the liquid starts to be sent to when the signal strength rises are delay times at the time of starting to send the liquid, and these delay times are desirably short. As can be seen from FIGS. 7A-7B, the rise in (a) is about 10 seconds faster than the rise in (b). This is because, since an air has a remarkably lower viscosity than a liquid (here, a solvent), a channel resistance within the sample supply main channel 416 after the liquid starts to be sent is small, and a liquid supply speed is high. From this measurement result, it is possible to confirm that the liquid sample can be quickly nebulized from the second ESI probe 207 at the time of the next analysis or at the time of resuming the interrupted analysis in the liquid sample introduction unit 4 of the aforementioned embodiment.

Figure 4:
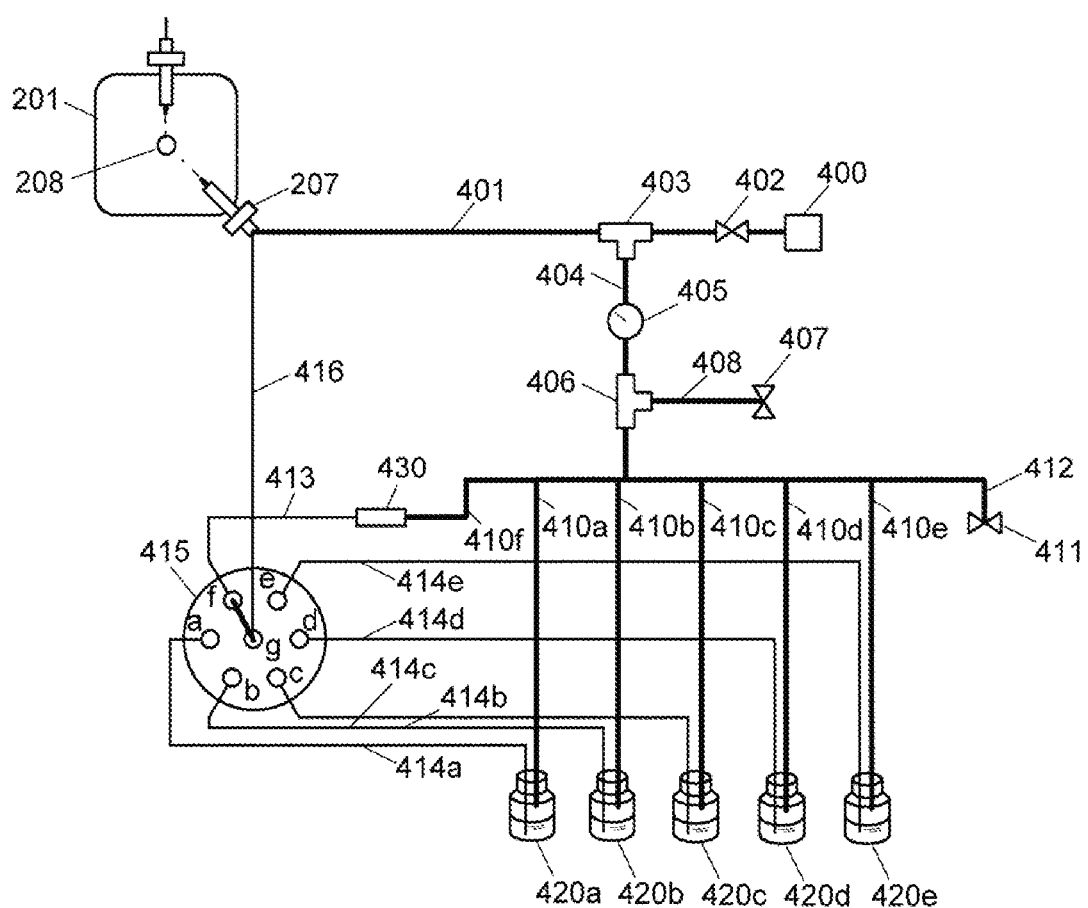
FIG. 4 is a channel configuration diagram illustrating another embodiment (second embodiment) of the liquid sample introduction unit.
Figure 5:
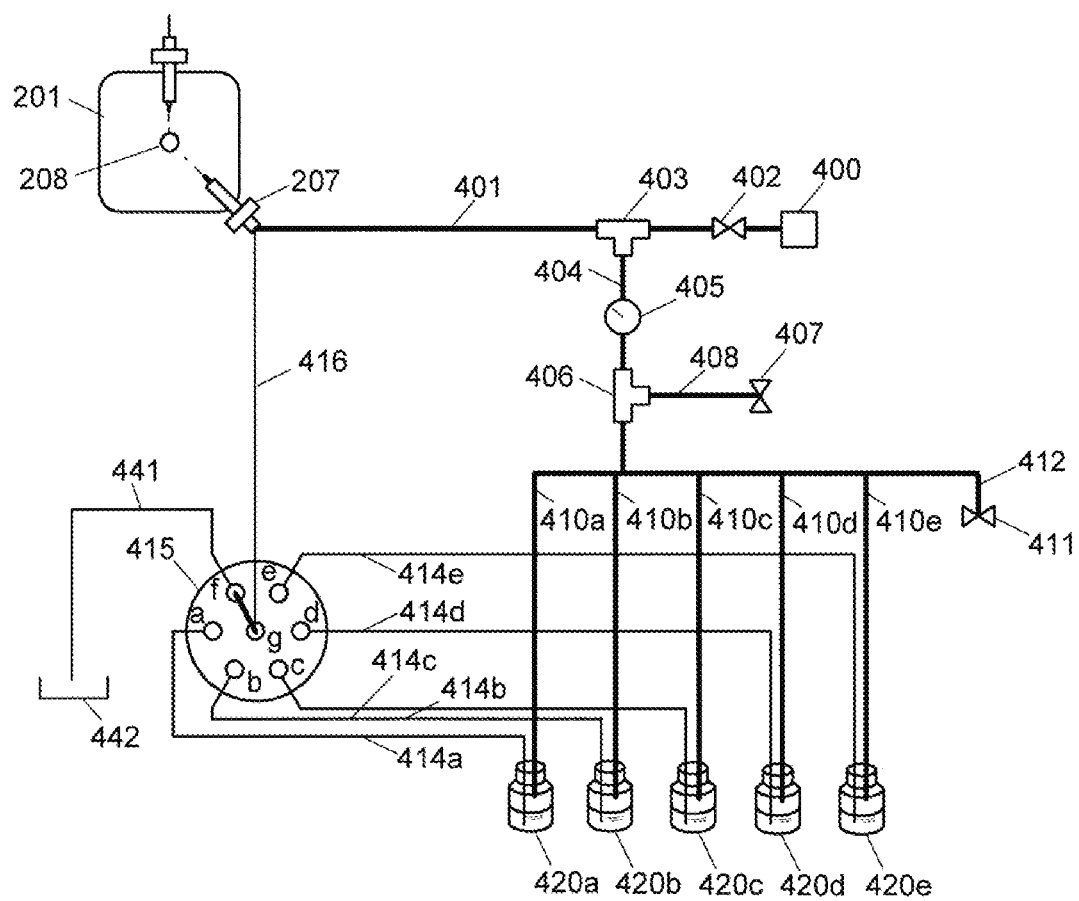
FIG. 5 is a channel configuration diagram illustrating another embodiment (third embodiment) of the liquid sample introduction unit.
Figure 6:
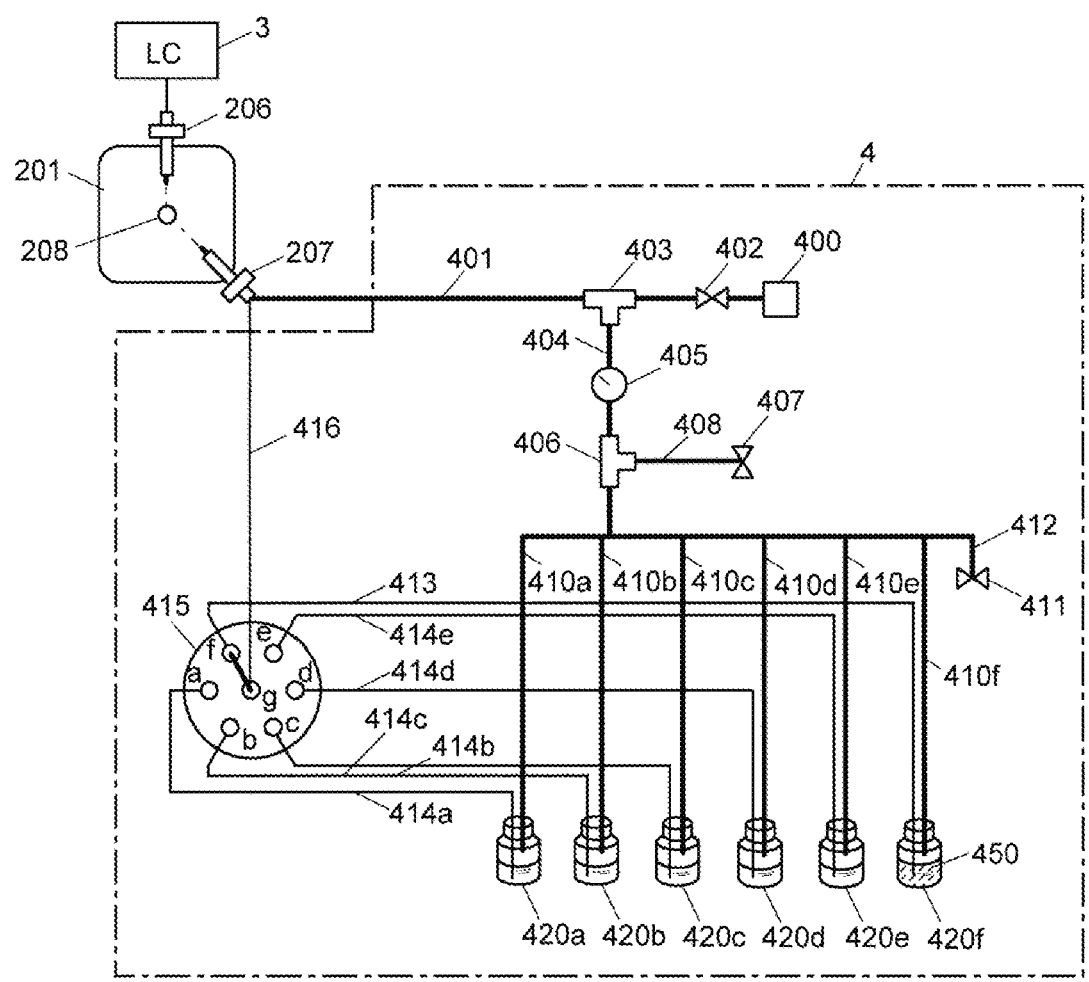
FIG. 6 is a channel configuration diagram illustrating another embodiment (fourth embodiment) of the liquid sample introduction unit.

Configuration and Operation of Liquid Sample Introduction Unit According to Another Embodiment FIGS. 4 to 6 are channel configuration diagrams of the liquid sample introduction unit according to second to fourth embodiments, respectively.

In the liquid sample introduction unit illustrated in FIG. 4, the replacement gas path 413 and the liquid supply gas branch channel 410f connected to the sub-port f of the 6-position 7-port valve 415 are directly connected by using a joint 430 instead of providing the gas buffer container in the first embodiment. Accordingly, at the time of finishing the series of analyses, the branched nitrogen gas is sent into the sample supply main channel 416 through the replacement gas path 413 and the internal channel of the 6-position 7-port valve 415, and thus, the standard sample and the solvent remaining in the sample supply main channel 416 can be quickly removed.

In the liquid sample introduction unit illustrated in FIG. 5, the other end of the replacement gas path 441 one end of which is connected to the sub-port f of the 6-position 7-port valve 415 is connected to a drain 442. The end of the replacement gas path 441 connected to the drain 442 is substantially open to the atmosphere, and a gas pressure at this end is substantially an atmospheric pressure. At the time of finishing the series of analyses, when the main port g and the sub-port f are connected in the 6-position 7-port valve 415, the replacement gas path 441 and the sample supply main channel 416 are communicatively connected to each other through the internal channel of the valve 415. At this time, the nitrogen gas is continuously supplied from the nitrogen gas cylinder 400 to the nebulizing gas path 401, and the gas is ejected, as the nebulizing gas, from the second ESI probe 207 into the ionization room 201.

Due to this gas flow, the end of the sample supply main channel 416 connected to the second ESI probe 207 has a negative pressure (a pressure lower than the atmospheric pressure). Therefore, a pressure difference occurs between both the ends of the sample supply main channel 416 and the replacement gas path 441 via the internal channel of the valve 415, and thus, the air sucked into the replacement gas path 441 from the end on the drain 442 side flows to the sample supply main channel 416. Thus, the standard sample and the solvent remaining in the sample supply main channel 416 are pushed out and are removed. The supply of the nitrogen gas from the nitrogen gas cylinder 400 to the nebulizing gas path 401 may be executed for a predetermined time.

In the aforementioned embodiments, the liquid in the sample supply main channel 416 is removed by the nitrogen gas or the air. However, in the liquid sample introduction unit illustrated in FIG. 6, a low-viscosity liquid sample container 420f in which a low-viscosity liquid is stored is disposed instead of the gas buffer container 421 in the liquid sample introduction unit 4 illustrated in FIG. 2. The low-viscosity liquid mentioned herein is a liquid having viscosity lower than the viscosity of the liquid likely to remain in the sample supply main channel 416, such as the standard sample, the liquid eluted from the LC unit 3, and the moving phase used in the LC unit 3. In general, the solvent of the standard sample and the moving phase used in the LC unit 3 are organic solvents or a mixture of water and organic solvents. Since the organic solvent has viscosity higher than water, water has viscosity lower than the organic solvent alone or a mixture of water and an organic solvent. Therefore, water may be generally used as the low viscosity liquid.

At the time of finishing the series of analyses, when the main port g and the sub-port f are connected in the 6-position 7-port valve 415, the low-viscosity liquid flows to the sample supply main channel 416 through the internal channel of the valve 415, and a remaining higher-viscosity liquid is pushed out and is removed. Therefore, at the time of the next analysis or at the time of resuming the temporarily interrupted analysis, the sample supply main channel 416 is filled with the low-viscosity liquid, and is more quickly discharged than a general standard sample which is not as much as the air or the nitrogen gas. Accordingly, it is possible to quickly introduce the liquid sample to the second ESI probe 207 at the time of the next analysis or at the time of resuming the interrupted analysis, and it is possible to achieve an effect close to the effect of the above embodiments.

Although it has been described in the mass spectrometer of the aforementioned embodiment that a plurality of kinds of standard samples are selectively introduced to the second ESI probe 207, the liquid sample sent to the second ESI probe 207 is not limited to only the standard sample for mass calibration. For example, a liquid sample to be analyzed can be introduced. A cleaning solution for cleaning the sample supply main channel 416 and the individual sample supply channels 414a to 414f can be sent. The eluted liquid or the standard sample is selectively ionized by switching the connection of the valve 415 by supplying the liquid eluted from the LC unit 3 to one of the sub-ports of the 6-position 7-port valve 415 in the liquid sample introduction unit 4. In this case, the first ESI probe 206 is not required unless it is necessary to simultaneously ionize the eluted liquid sent from the LC unit 3 and the standard sample.

Although it has been described in the mass spectrometer of the aforementioned embodiments that the ESI is used as the ionization method, the present invention can be applied to ACM and APPI as long as an ionization probe appropriate for the ionization method is used.

The aforementioned embodiments are merely examples of the present invention, and it is apparent that points other than the above description are included in the scope of the present application even though appropriate changes, corrections, and additions are made within the scope of the gist of the present invention.

REFERENCE SIGNS LIST

1 . . . Measurement Unit
2 . . . Mass Spectrometry Unit
200 . . . Chamber
201 . . . Ionization Room
202 . . . First Intermediate Vacuum Room
203 . . . Second Intermediate Vacuum Room
204 . . . Pre-Stage Analysis Room
205 . . . Main Analysis Room
206 . . . First ESI Probe
207 . . . Second ESI Probe
208 . . . Desolvation Tube
209, 211, 214 . . . Ion Guide
210 . . . Skimmer
212 . . . Quadrupole Mass Filter
213 . . . Collision Cell
215 . . . Ion Transport Optical System
216 . . . Orthogonal Acceleration Unit
217 . . . Flight Space
218 . . . Reflector
219 . . . Ion Detector
3 . . . LC Unit
4 . . . Liquid Sample Introduction Unit
400 . . . Nitrogen Gas Cylinder
401 . . . Nebulizing Gas Path
402 . . . Valve
403, 406 . . . Branch Part
404 . . . Liquid Supply Gas Main Channel
405 . . . Regulator
407 . . . Relief Valve
408 . . . Relief Channel
410a to 410f . . . Liquid Supply Gas Branch Channel
411 . . . Atmosphere Release Valve
412 . . . Atmosphere Release Channel
413, 441 . . . Replacement Gas Path
414a to 414e . . . Individual Sample Supply Channel
415 . . . 6-Position 7-Port Valve
A to F . . . Sub-Port
G . . . Main Port
416 . . . Sample Supply Main Channel
420a to 420e . . . Liquid Sample Container
420f . . . Low-Viscosity Liquid Sample Container
421 . . . Gas Buffer Container
430 . . . Joint
442 . . . Drain
5 . . . Control Unit
51 . . . Storage Unit
52 . . . Analysis Condition Setting Unit
53 . . . Analysis Control Unit
6 . . . Input Unit
60 . . . Common Sample Supply Channel
7 . . . Display Unit
C . . . Ion Optical Axis

The invention claimed is:

1. A liquid sample introduction method using a liquid sample introduction device configured to send a liquid sample and a nebulizing gas to an ionization probe of an ion source in an ion analysis device and to nebulize the liquid sample from a tip of the ionization probe with the help of the nebulizing gas, the liquid sample introduction device including a plurality of liquid sample containers each of which is a closed container and a liquid sample is stored, a liquid supply gas path connected at one end to a middle of a channel for supplying the nebulizing gas to the ionization probe and branched into a plurality of sub-paths each end of which is connected to each of the plurality of liquid sample containers above liquid levels of the liquid sample, a channel switching unit configured to selectively connect one outlet port and one of a plurality of inlet ports, a common sample supply channel one end of which is connected to the ionization probe and another end is connected to the outlet port of the channel switching unit, and a plurality of individual sample supply channels one ends of which are connected to the plurality of liquid sample containers below the liquid levels of the liquid samples and other ends are connected to the plurality of inlet ports of the channel switching unit, the method comprising:

a process of setting one of the plurality of liquid sample containers to be in an empty state, and switching connection of the channel switching unit such that the outlet port and the inlet port connected to the liquid sample container which is in the empty state are connected to each other through one of the plurality of individual sample supply channels at a time of finishing analysis in the ion analysis device.

2. A liquid sample introduction device configured to send a liquid sample and a nebulizing gas to an ionization probe of an ion source in an ion analysis device and to nebulize the liquid sample from a tip of the ionization probe with the help of the nebulizing gas, the device comprising:

a) a liquid sample container which is a closed container in which a liquid sample is stored;

b) a gas buffer container which is in a closed state;

c) a gas supply auxiliary path connected at one end to a middle of a path for supplying the nebulizing gas to the ionization probe and branched into sub-paths one of which is connected to the liquid sample container above a liquid level and another to the gas buffer container;

d) a channel switching unit configured to selectively connect one outlet port and one of a plurality of inlet ports to each other;

e) a common sample supply channel one end of which is connected to the ionization probe and another end is connected to the outlet port of the channel switching unit;

f) an individual sample supply channel one end of which is connected to the liquid sample container so as to be positioned below the liquid level of the liquid sample and another end is connected to one of the plurality of inlet ports of the channel switching unit;

g) a replacement gas path one end of which is connected to the gas buffer container and another end is connected to one of the plurality of inlet ports of the channel switching unit; and h) a control unit configured to switch connection of the channel switching unit such that the outlet port and the inlet port connected to the replacement gas path are connected to each other at a time of finishing analysis in the ion analysis device.

\* \* \* \* \*